United States Patent [19]

Starling

[11] Patent Number: 4,569,669
[45] Date of Patent: Feb. 11, 1986

[54] DRIVE UNITS FOR EFFECTING TORQUE-TRANSMISSION VIA A NON-ROTATING SEALING TUBE

[76] Inventor: John M. Starling, Willowdale, Draffyn's La., Camber, East Sussex, England

[21] Appl. No.: 551,971
[22] PCT Filed: Jan. 20, 1983
[86] PCT No.: PCT/GB83/00010
 § 371 Date: Sep. 21, 1983
 § 102(e) Date: Sep. 21, 1983
[87] PCT Pub. No.: WO83/02654
 PCT Pub. Date: Aug. 4, 1983
[51] Int. Cl.[4] ............................................. F16J 15/50
[52] U.S. Cl. .................................... 464/175; 74/17.8; 74/640
[58] Field of Search ............... 464/175, 173; 74/17.8, 74/18, 18.1, 640

[56] References Cited

U.S. PATENT DOCUMENTS

| | | | |
|---|---|---|---|
| 1,736,974 | 11/1929 | King | 74/17.8 |
| 2,497,867 | 2/1950 | Cymmer | 74/17.8 |
| 2,697,356 | 12/1954 | Knudsen | 74/18.1 |
| 2,742,790 | 4/1956 | Nelson | 74/17.8 |
| 2,837,926 | 6/1958 | Korsgren, Sr. et al. | 74/17.8 |
| 2,860,933 | 11/1958 | Wolff | 74/17.8 X |
| 2,863,336 | 12/1958 | Parstorfer | 74/17.8 X |
| 2,978,914 | 4/1961 | Gut | 74/18.1 |
| 3,051,008 | 8/1962 | Hamren | 464/115 X |
| 3,128,641 | 4/1964 | Musser | 74/640 |
| 3,306,134 | 2/1967 | Winiarski | 74/18.1 |
| 3,364,754 | 1/1968 | Langer | 464/175 |
| 3,424,015 | 1/1969 | Lundy et al. | 74/17.8 |
| 3,457,795 | 7/1969 | Hamren | 74/17.8 |

FOREIGN PATENT DOCUMENTS

| | | |
|---|---|---|
| 1131054 | 6/1962 | Fed. Rep. of Germany . |
| 1248634 | 11/1960 | France . |
| 1356830 | 2/1964 | France . |
| 1357796 | 12/1964 | France . |
| 98132 | 3/1923 | Switzerland . |
| 217306 | 2/1942 | Switzerland . |
| 914312 | 1/1963 | United Kingdom . |

Primary Examiner—Stephen Marcus
Assistant Examiner—Leo Peters
Attorney, Agent, or Firm—Walter C. Farley

[57] ABSTRACT

Drive units for effecting torque-transmission via a non-rotating sealing tube are provided for various fields of use where a positive sealing is required for a shaft that passes through an aperture (e.g. a propeller shaft transmission). The shaft (4), rotatable about an axis (5), is freely mounted in a bearing bush in an aperture (3) in a wall (2) of a housing (1) that can take many forms. The other end of the shaft (4) is located in a blind-bearing. An intermediate eccentric portion (6) is provided on the shaft, which passes through an eccentric aperture (8) in a main eccentric. A non-rotating sealing tube (7) passes through this aperture, surrounding the portion (6), and is sealed by diaphragms, bellows or flexible hoses extending from each end to the related end of the shaft, where a static seal is formed.

14 Claims, 7 Drawing Figures

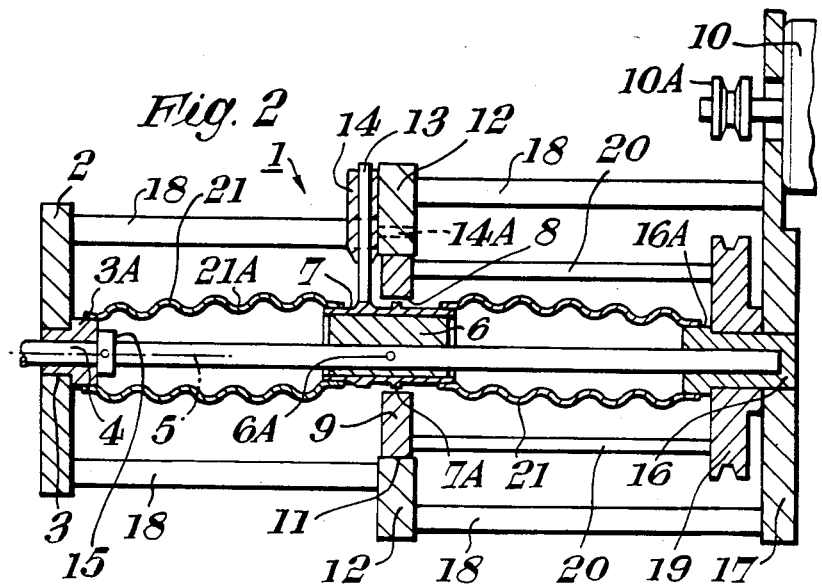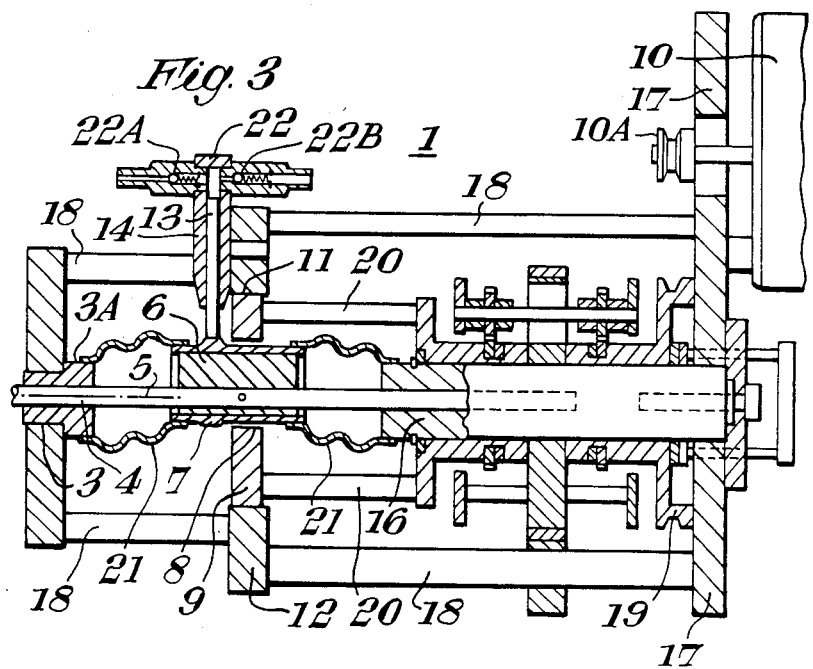

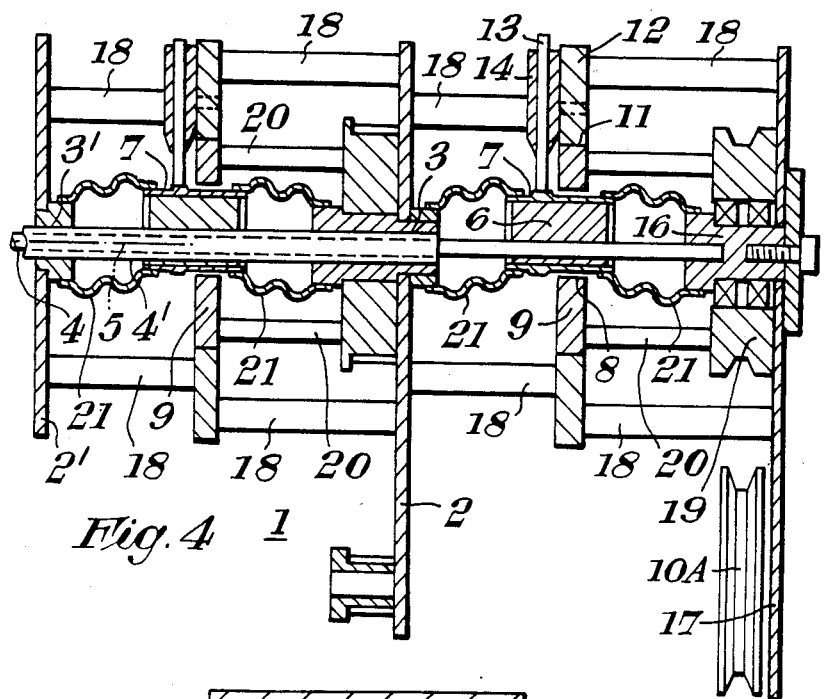
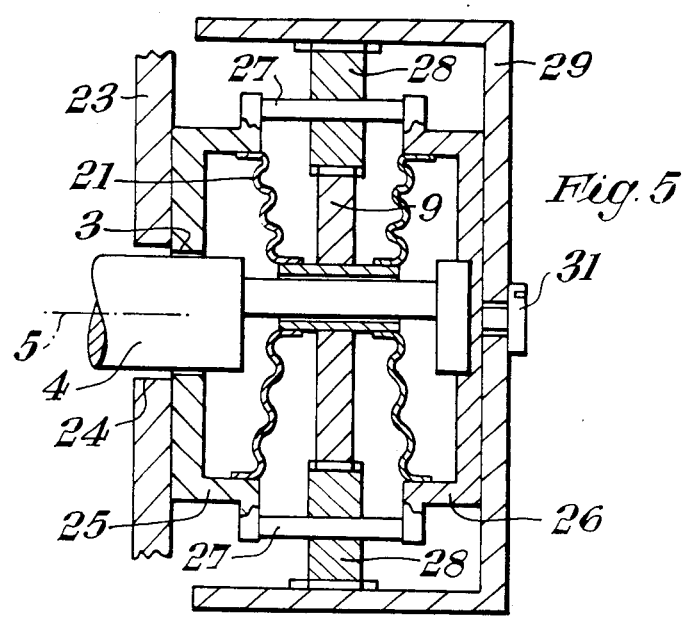

DRIVE UNITS FOR EFFECTING TORQUE-TRANSMISSION VIA A NON-ROTATING SEALING TUBE

The invention relates to drive units for effecting torque-transmission via a non-rotating sealing tube.

In many industrial applications it is necessary to provide for torque-transmission via a positively sealed unit, as for instance where a tool, control member or driving shaft is to be driven in any form of hostile environment, or in cases where a severe pressure-difference exists, e.g. in space vehicles or in submarine equipment. Even where the safety requirements are less demanding there may be a need for positive sealing without the excessive friction that is introduced by the use of glands. Thus, a simple water-tap that is positively sealed but easy to turn would be of benefit to the elderly or infirm. As an aid to greater efficiency in marine engineering, a propeller drive-shaft operable of withstanding external water pressure without incurring the energy losses that are consequent upon the use of normal glands to render the drive system water-tight would be of considerable value.

One object of the present invention is to provide a torque-transmission unit which avoids the disadvantages of conventional glands by using a non-rotating sealing tube as an intermediate member between an outer member and an inner member, the outer member being driven to rotate the inner member, or vice versa, and the drive being operable in either direction of rotation.

According to one preferred embodiment of the invention there is provided a drive unit for effecting torque-transmission via a non-rotating sealing tube, in which a central member rotatable in a housing and extending through an unsealed aperture in a wall thereof has an engagement portion that is eccentric with respect to its axis of rotation, an intermediate sealing tube is mounted freely on said engagement portion and freely fitted within a circular aperture in a main eccentric member which is mounted to be rotatable about said axis, the circular aperture in said main eccentric member having an eccentricity with respect to the axis of rotation of the central rotatable member that matches the eccentricity of said engagement portion, means being provided to drive said central rotatable member or said main eccentric to rotate about said axis of rotation, and output drive means being provided driven by said main eccentric or said central rotatable member, as the case may be, and sealing means being attached to said intermediate sealing tube to restrict rotation thereof about said central axis and couple its respective ends via associated flexible sealing members to housing portions that define a sealed enclosure to isolate said central member and said unsealed aperture from the remainder of the housing interior.

For intricate control of precision instruments, as for example, the setting of a specimen holder within an electron microscope, the central member may be the driving member, in the form of a shaft extending through an aperture in the wall of the microscope column, and a drive coupling can be arranged within the column to enable rotation of the main eccentric to effect the required adjustment, possibly by means of a set of gears, a rack and pinion drive or any other suitable mechanical arrangement. In such cases, where the power involved is low, and precision is the principle requirement the geometry may be such that the eccentric portion of the central member is formed by an offset circular section of reduced cross-section, but in the majority of applications the central member will be a shaft, and the eccentric portion will be formed by an integral or attached annular enlargement. The actual geometry will be determined by the drive characteristics required in any particular case, i.e. whether a high speed of rotation or a powerful output is the primary consideration, or whether both are required.

The material selected will also be dependent to some extent on the nature of the sealing problem. Where working in a hostile environment is required, the nature of the physical or chemical hazard will determine the selection of the materials for the sealing means. In other applications the extent of any pressure-difference that needs to be withstood, the work-load and the operating speed will all play a part in determining whether flexible metal loses are to be preferred to some form of synthetic resin, for example.

The invention will now be described with reference to the drawings, in which:

FIG. 2 is a schematic simplified longitudinal cross-section through one exemplary embodiment for a marine propeller shaft transmission;

FIG. 3 is a schematic simplified longitudinal cross-section through another exemplary embodiment for a marine propeller shaft transmission, provided with reversing means and with a lubricating circulation pump;

FIG. 4 is a schematic simplified longitudinal cross-section through an exemplary embodiment of yet another marine propeller shaft transmission, providing for concentric shafts for separate functions;

FIG. 5 is a schematic simplified longitudinal cross-section through an exemplary embodiment of a manual control for use on an electron microscope column;

The invention will now be described with reference to a variety of embodiments, which have been selected to emphasise the versatility of the torque-transmission unit, and its easy adaptation to any field of use where there is need to provide positive sealing for the sake of hygiene, for the avoidance of health hazards, or to avoid any danger of fire, explosion or contamination. In addition embodiments for use in instruments that involve the maintaining of a high vacuum will be discussed, and this aspect is equally applicable to space vehicle applications to preserve a viable atmospheric pressure and avoid lubrication problems.

Figure 1:
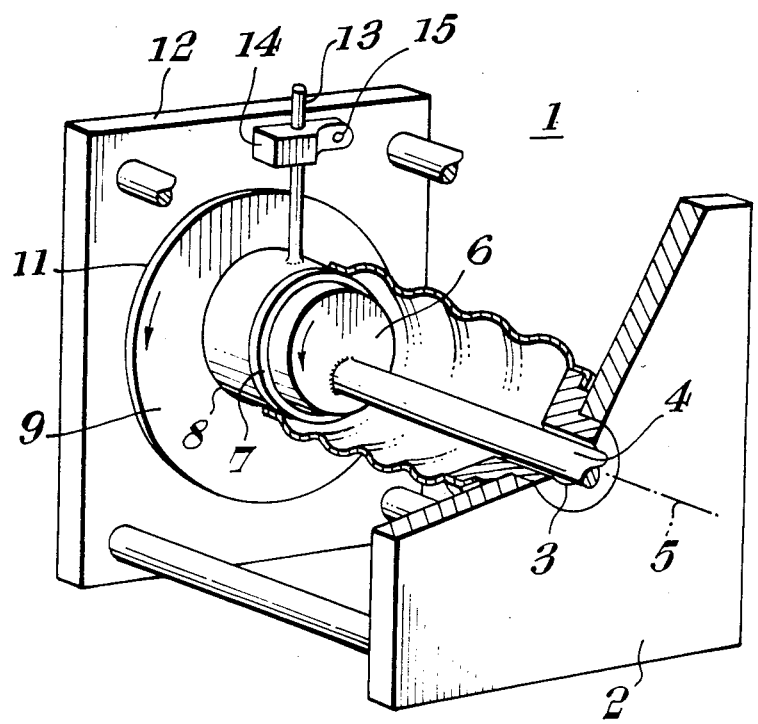
FIG. 1 is a schematic, fragmentary perspective view for use in explaining the relationship of the components that effect torque-transmission between a central and an outer member via a non-rotating sealing tube in one preferred embodiment of the invention.

In the explanatory view of a preferred embodiment shown in FIG. 1, a housing 1 comprises a wall 2 having an aperture 3 through which passes a shaft 4 which forms the central member of this embodiment. The aperture 3 is not sealed, although there will normally be some form of bearing or bush. The essence of the invention is to provide sealing means which isolate the general interior of the housing from the exterior, so that no fluid, be it liquid or gas, can enter or leave via the aperture 3 to reach or flow from the general interior, which is fully and positively isolated by sealing means which enclose the shaft 4, as will be described.

The shaft 4 is mounted in the housing so as to be rotatable about its axis 5, being supported by such bearings, (not shown), as may be required for the intended power loading and speed of rotation. At an intermediate position on the shaft 4 an engagement portion is provided to enable torque to be applied to or from the shaft 4. In this embodiment the engagement portion is an annular bush 6 having a bore parallel to but off-set from its longitudinal axis, and the shaft 4 passes through this bore and is secured therein by a pin (not shown). A sealing tube 7 freely surrounds the bush 6 and is in turn freely fitted in an aperture 8 formed in a main eccentric 9. In this embodiment the main eccentric is annular, and is carried by a support ring bearing surface 11 formed in an outer member 12 that is a fixed part of the housing, and the surface 11 is coaxial with the shaft 4. By arranging the aperture 8 in the main eccentric 9 so that it matches the eccentricity of the bush 6 with respect to the shaft axis 5, any rotation of the shaft 4 in either direction causes a thrust to be applied through the wall of the sealing tube 7 and cause rotation of the main eccentric. Equally, any rotation of the main eccentric 9 will cause the shaft 4 to rotate. Surprisingly, it has been found that the sealing ring 7 can be restrained from revolving, without impeding the torque-transmission, so that when operating, the tube 7 moves on an orbital path around the axis 7, but can be positively restrained so that it does not rotate axially, and any line drawn as a diameter through the centre of the sealing tube will maintain a constant angle relative to any reference plane parallel to the axis 5. Therefore a positive seal can be completed by fixing a separate flexible hose, bellows or diaphragm to extend from each end of the sealing tube to an associated anchorage on the housing, to fully isolate the area adjacent the shaft 5 and aperture 3 from the remainder of the housing. As the separate sealing components do not move with respect to each other in the rotational sense, the joints can be made firm and rigid, to ensure a fully effective, reliable and endurable seal. The housing 1 is represented in a purely schematic manner in FIG. 1, which is only intended to clarify the complex relationship of the elements that provide for torque-transmission through a non-rotating tube, and depending upon the apparatus requirements flat apertured diaphragms with annular corrugations can be used to complete the sealing of the tube 7 in cases where the housing is compact and the shaft relatively short, or flexible hoses or bellows can be used where the shaft length and the degree of eccentricity make such sealing members more convenient, as it is most desirable that there should be no significant restriction imposed on the rotation of the main eccentric or the shaft, but only on the sealing tube 7. In many cases, by using metal hoses with annular corrugations, which can be termed bellows, or by using metal diaphragms, the sealing means themselves may be sufficiently twist-resistant to restrain the sealing tube from turning. However, it is possible to provide a positive restraint on the tube 7, and release the sealing means from any torsional stresses by providing one or more piston rods 13 rigidly extending radially from the sealing tube. The or each piston rod is a sliding fit in an associated cross-head cylinder bush 14 that is mounted to rock on a pivot pin 15 secured to the support ring member 12. With this arrangement, as the eccentrics rotate together, the sealing tube 7 moves on its orbital path from the top dead-centre position shown to a position 90° around the axis 5, when the piston rod 13 is tilted to its maximum in one direction and is half-withdrawn from the cylinder bush 14, that has rocked on its pivot pin 15. Further rotation of the eccentrics to their bottom dead-centre position brings the piston rod back to its vertical position (as drawn), and at its lowest position with respect to the cylinder-bush 14. Further rotation through 90° will bring the piston rod back up to its mid-position with maximum tilt in the other direction. Thus, the sealing tube 7 is permitted to undergo a very limited rotation back and forth about the axis, but the extent can be limited to avoid any undesirable stress being applied to the sealing means. If total restraint is required, a cylinder bush mounted to slide from side to side could be used to keep the piston rod vertical (as drawn) at all times.

In this highly schematic illustration details of the housing have been deliberately omitted, and it will be realised that in many applications the housing itself may be an open frame-work, as the sealing means provide a totally sealed internal chamber about the shaft 5, to ensure that there is no fluid flow path via the aperture 3.

We will refer now to the more detailed illustration given in FIG. 2, which is a longitudinal cross-section of an exemplary embodiment suitable for driving the propeller shaft of a boat.

The output end of the drive shaft 4 extends through a bearing bush in the aperture 3 of the housing end plate 2, and a shaft retaining collar 15 is fitted to prevent any movement along the rotational axis 5. The enlargement of the central member constituted by the shaft 4 at an intermediate point along the shaft is provided by the eccentric engagement portion 6, which is secured to the shaft 4 by a pin 6A. The inner end of the shaft 4 is located by a blind bearing-bush 16 which is tightly sealed to a further end plate 17 that constitutes the other end of the housing. Pillars 18 are provided between the wall-plate 2 and the support ring 12 to hold them together as a rigid structure, and further pillars 18A extend from the support ring 12 to the end-plate 17 to form a further rigid portion of the housing 1. Thus the rotational axis 5 is clearly defined, and the long thin shaft 4 is engaged via the inner eccentric 6, through the sealing tube 7, with the main eccentric 9, that rotates in the support ring surface 11 to operate in the manner described with reference to FIG. 1.

In this embodiment the main eccentric 9 is driven by an electric motor 10 mounted on the end plate 17 and having a belt drive provided between a drive pulley 10A and a driven pulley 19 which is held free to rotate by the outer surfaces of the blind-bush 16. The drive is transmitted from the pulley 19 to the main eccentric 6 via drive pillars 20 which rigidly interconnect this sub-assembly.

The sealing tube 7 is provided with a piston rod 13 that engages in a cylinder bush 14, as described with reference to FIG. 1. The cylinder bush 14 is pivotally mounted to the support ring member 12 by a pivot pin 14A, to permit the limited rocking action that is required.

The positive sealing to prevent any water entering freely via the output shaft is effected by securing a flexible metal hose or bellows 21, having annular corrugations 21A, to extend between the stationary outer-rim 3A of the bearing bush that freely supports the output shaft in the aperture 3, along to the outer rim of the adjacent end of the sealing tube 7. As this tube is substantially non-rotatable, the sealing can be firm and positive at each end of the hose 21. In similar fashion, the far end of the sealing tube 7 is coupled to a stationary rim 16A of the fluid bearing bush 16, so that a totally enclosed inner cavity is formed about the shaft 4, and water entering via the output aperture cannot penetrate further into the housing.

In order to reduce frictional forces between the outer-wall of the sealing tube 7 and the wall defining the aperture 8 in the main eccentric, the contact area can be reduced by the provision of an annular flange 7A, or a separate slip-ring of some low-friction material can be fitted. In the majority of cases however, it has been found sufficient to allow a clearance between the two surfaces, so that the point of contact moves around the sealing tube 7. This clearance may permit a certain degree of backlash, which can be substantially eliminated by appropriate counter-measures; to be described later.

Friction between the inner wall of the sealing tube 7 and the outer face of the eccentric engagement portion 6 can be reduced by the provision of a roller bearing using a ball-race or needle-race. The configuration of the housing structure is open to a multitude of variations, provided only that there is adequate rigidity to define the inner bearing and output aperture with reference to the main eccentric. Thus the electric motor 10 can be mounted on the inner face of the plate 17 if the installation requirements make such a modification desirable, and a number of additional features may be provided, where necessary.

FIG. 3 shows a further preferred embodiment which is generally similar to the embodiment shown in FIG. 2 but has an additional feature a reversible drive mechanism mounted on an extended blind bearing to be coaxial with the axis of rotation 5. The drive pulley 19 is now linked to the main eccentric 9 via drive pillars 20 and a known reversible gear arrangement.

A further additional feature shown in FIG. 3 is the modification to convert the piston rod 13 into a lubricating pump to circulate a lubricant around the requisite parts via pipes (not shown). A cylinder head 22 is provided on the cylinder bush 14, and an input port 22A provided with a non-return ball-valve permits entry of lubricant as the piston rod moves down during each revolution of the shaft 4. An output port 22B with a non-return ball-valve permits the charge of lubricant that has been drawn in on the down-stroke of the piston rod 13 to be ejected on the up-stroke.

If a hollow piston rod is used, it will then be possible to use the interior channel thus provided to purge the interior of the bellows system and maintain efficient lubrication and/or remove heat.

It will be readily apparent that the modification of FIG. 3 referred to above to introduce a cylinder head 22 introduces th possibility of employing a suitably robust construction to act as an internal combustion prime mover. However, if space permits it would be more effective to utilise a prime mover to directly drive the main eccentric, and any known means may be used.

A further example of a marine application is shown in simplified form in FIG. 4, which provides for the separate driving of two concentric shafts. A blind bearing-bush 16 sealed to the end plate 17 carries one end of the shaft 4 which extends through a first sealing tube 7 to be driven via the main eccentric 9 from a driven pulley 19 that is coupled via a belt drive to an electric motor 18. The shaft 4 extends through a first aperture 3 in the wall 2, and continues on to pass through a further torque-transmission unit inside a further shaft 4'. The shaft 4' extends from its bearing bush in the aperture 3 to engage with a further main eccentric 9' via an eccentric engagement portion 6' formed by a bush secured to the shaft 4'. Both shafts pass through a further aperture 3' in a final wall 2'. Respective sealing hoses or bellows 21 complete a sealed chamber enclosing the shafts and prevent water entering the housing structure via the aperture 3'.

The two shafts, 4 and 4' may be rotated in opposite directions, to drive respective propellers, for example, or one may be used as a propeller shaft and one used for other purposes, such as controlling a rudder. Therefore the actual drive arrangements for the further main eccentric 9' have not been shown in this schematic representation.

The embodiment shown in FIG. 5 is an example of a low-speed, low-torque construction, in the form of a control knob for manually rotating a linkage within an electron microscope column, whilst preserving the vacuum. Such external controls are required for setting the position of a specimen holder, for example, and a positive seal is obviously most desirable to maintain the working efficiency of the microscope and avoid any overloading the vacuum pumping system. In this application of the torque-transmission unit extreme precision is required but the low output requirements enable the configuration to be modified, and an effect manual control knob can be provided which actually contains the sealing and drive mechanism within the confines of a knob that can be shaped externally to provide a firm but comfortable grip.

In the illustration a wall 23 represents an outer wall of an electron microscope column, in which there is an aperture 24 provided to give access to a control linkage (not shown), which is within the vacuum chamber. The wall 2 of the housing 1 in this embodiment is secured in air-tight fashion to the outer surface of the wall 23 with the aperture 3 aligned with the aperture 24, so that the shaft 4 rotatable about the axis 5 passes into the column to engage with the control linkage and provide the necessary adjustment facility. The housing 1 consists of two cup-shaped members, the wall 2 having a raised annular rim 25 extending towards an annular rim 26 that is integral with the end plate 17 containing the blind bearing 16 for the outer end of the shaft 4. The rims 25 and 26 are spaced apart by three link rods 27 symmetrically spaced around the axis 5, and only one is shown in the schematic drawing, for the sake of simplicity. Each end of the rod is firmly secured to a respective rim to form a rigid housing and positively define the axis 5. Instead of an enlargement such as the bush that is used in the embodiments described above, an eccentric engagement portion 6 is formed in this embodiment by forming a groove of varying depth around the shaft 4 to leave a cylindrical surface that is eccentric with respect to the axis 5. This can most readily be achieved by joining two separate end portions of the shaft by a rod of smaller diameter firmly engaged within respective bores, one in each of the separate end portions. The sealing tube 7 can be fitted before the shaft assembly is completed, and will have attached thereto sealing members 21, one at each end, each in the form of an apertured disc with concentric annular corrugations, so that the inner aperture can be firmly sealed to the associated end of the sealing tube 7, whilst the corrugations accommodate the reciprocating action when the shaft 4 is rotated. In this embodiment the main eccentric 9 is fitted freely about the tube 7 before the sealing members are attached. The outer edges of the sealing members 21 are firmly attached, one to each of the rims 25 and 26, possibly with the aid of clamping rings (not shown). This completes the sealed zone around the shaft 4, so that there can be no passage for entry of air into the column via the aperture 3 when the control knob has been sealed to the wall 23. The link rods 27 each carry a rotatable gear-wheel 28, and these engage with teeth formed around the outer surface of the main eccentric 9 in this embodiment, so that the main eccentric is accurately positioned with respect to the axis 5, and can be driven via the gear wheels 28 on the link rods 27. A cup-shaped hand-grip 29 is positioned over the assembly, and an internally toothed ring that is carried on the inner wall of the hand-grip 29 engages with the teeth of the three gear wheels 28, so that rotation of the hand-grip 29 in one direction about the axis 5 drives the shaft 4 to rotate in the opposite direction. A fixing stud 31 is provided to retain the hand-grip in position on the housing 1, being screwed into the end plate 17 and passing through a clearance aperture in the hand-grip 29.

A configuration such as this is particularly suitable for manual controls of all kinds, since the relatively large diameter shaft 4 can accommodate a splined or keyed end-face portion to engage with appropriate linkages, or serve as a belt or rim drive wheel, and permits adaptation to many types of control function, in a compact assembly with a totally positive seal. Roller bearings with ball or needle races can be used to advantage, where the degree of precision that is required justifies the additional cost, and yet the components are of a shape and nature that makes them readily manufacturable by moulding synthetic resin material. In some applications it may be more advantageous to employ an enlarged engagement portion, such as was described with reference to the earlier embodiments, if a thinner shaft is required, as might be the case for use in controlling a water tap, for example.

It was stated above with reference to FIGS. 2 and 3, that in some high-speed applications it would be advantageous to reduce the friction between the main eccentric 9 and the support ring member 12, and provided that the assembly is rigid enough to maintain the desired alignment of the main eccentric with reference to the axis 5. This could be achieved by modifying the arrangement shown in FIG. 1 so that the pillars 18 and 18A are combined and extend directly from the wall 2 to the end plate 17. The main eccentric 9 will then be supported solely by the pillars 20, or these could be replaced by a tubular support linking the main eccentric 9 to the driven pulley 19. Any piston rod 13 would be positioned to engage in a cylinder-bush 14 mounted from a pillar 18. The pillars 18 could themselves be replaced by a tubular housing member extending between the wall 2 and end plate 17, but allowing clearance for the main eccentric 9.

Figure 6:
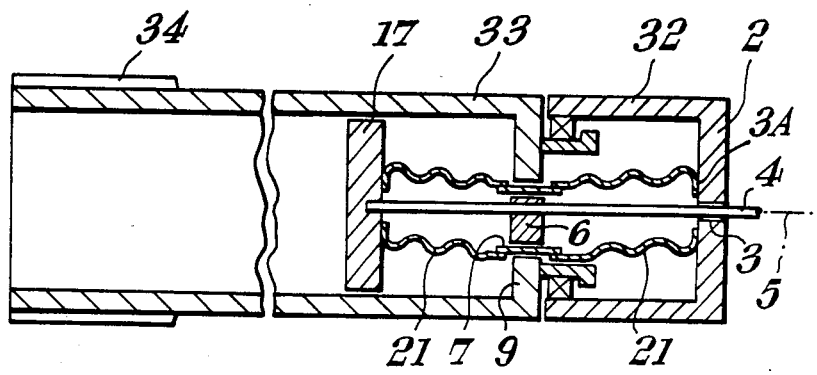
FIG. 6 is a schematic simplified longitudinal cross-section through an exemplary embodiment of a working tool for use in clearing passage-ways in a nuclear reactor.

This concept leads to the further exemplary embodiment shown in FIG. 6, which reduces the overall diameter and may be of use for drive-transmission, manual control, or as a working tool in conditions where space is limited.

The embodiment shown is intended to be used for clearing a pathway in a nuclear reactor, which may become blocked due to disintegration of material from a fuel element, for example. The housing 1 is now of elongate tubular form, and carries a front wall 2 in which there is an aperture 3 through which the shaft extends to form a scraper tool in this example. The main eccentric 9 has a diameter equal to that of a tubular sleeve 32 which extends from the wall 2 to support a roller bearing mounted on the main eccentric 9 and passing into the adjacent end of the tubular sleeve 32 so that the main eccentric is positively located for rotation about the axis 5. Sealing means 21 in the form of an annular-corrugated hose complete a seal from the rim 3A of the aperture in the wall 2 to the adjacent end of the sealing tube 7 which passes through the aperture in the main eccentric. The inner end of the shaft 4 is located in a blind-bearing in an end-plate 17 which is located within a tubular extension 33 of the main eccentric, which rotates about the end-plate 17, the latter being restrained from rotation due to the positive sealing provided by a further sealing hose 21, in like manner to that described with reference to FIGS. 2 and 3. The length of the extension 33 will be determined by the requirements of the installation in which it is to be used, but at its end there is formed a hand-grip 34, which can be turned to rotate the tool held by the inner end of the shaft 4, to scrape any material that may be obstructing the free passage of a fuel element from the wall surface of a passage-way with a nuclear reactor assembly. On the static tubular sleeve 32 there will be provided at least one, and preferably a sequence of sealing fixtures, (not shown) that are adapted to form an external seal around the sleeve 32, between the sleeve and the inner surface of the passage-way that is to be cleaned. It is assumed here that the presence of unwanted fragmentary particles attached to the passage-way wall will have been established by visual examination using an optical or television-type probe. In some circumstances it may be justifiable to use a more sophisticated working tool, which exploits the adaptability of a sealed torque-transmission unit constructed in accordance with the present invention to maximum effect. The arrangement of the shaft within the main eccentric is preferably such that there is a central portion that passes straight through the unit. Therefore, if structural limitations on size, and physical demands upon torque-transmission permit it, a central hollow bore can be formed down the length of the shaft 4. This can contain optical fibre illuminating meand and/or viewing means, together with electrical cables for operating actuators, gripping members, manipulators and the like. If these fibres or cables are passed through the end-plate 17 via a hermitically-sealed lead-through member, they can extend out to the operating hand-grip, where any required control, display or illuminating means may be provided, as required for any specific function. Such a work-piece can be used to advantage in various fields where hazardous conditions are to be encountered within any installation having tubular passage-ways and involving hostile atmospheres, dangerous chemicals or general radiation hazards.

Where there is a high danger level, a plurality of individually sealed sealing members may be superimposed to form a multiple barrier between a wall aperture 3 and an end-plate 17, or a sequence of torque-transmission units may be fitted in a series assembly to provide a plurality of positive seals.

Finally, it is necessary to consider in fuller detail the means that may be employed to reduce friction and eliminate back-lash, whilst ensuring efficient torque-transmission.

Figure 7:
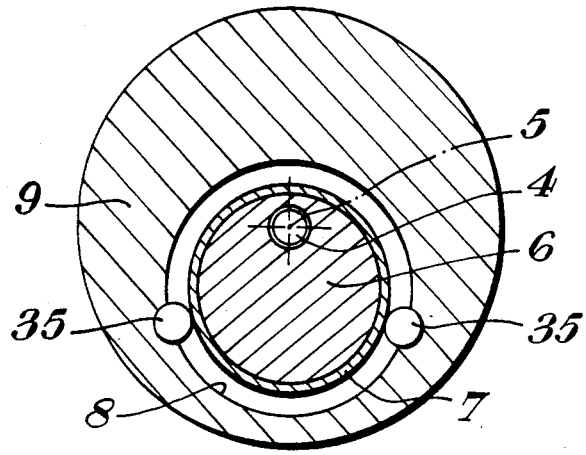
FIG. 7 is a transverse schematic illustration of means for reducing friction and avoiding back-lash at the interface between the main eccentric, the sealing tube and the engagement portion of the shaft.

FIG. 7 is a transverse schematic illustration of the relationship between main eccentric 9, sealing tube 7 and engagement portion 6 of the shaft 4, the illustration being purely explanatory, and omitting any details of roller bearings, etc. An early embodiment of a transmission drive used a shaft 4 having a diameter of 1 cm., with an eccentric engagement portion 6 having a diameter of 2.1 cm., whose longitudinal axis was off-set from the shaft axis 5 by 0.5 cm in the direction of the eccentricity of the aperture 8 in the main eccentric 9. A sealing tube 7 was seated upon the outer surface of the engagement portion 6 by a roller bearing employing a needle-race (not shown), and the aperture 8 in the main eccentric had a diameter of 2.54 cm. A positive high-speed drive was obtained, in this way.

In low-speed embodiments, where the expense of a roller or needle race is not justified, a greater clearance may be provided to reduce frictional wear, but this leads to some back-lash at start-up to shut-down in either direction of drive. To eliminate this the configuration schematically illustrated in FIG. 7 was adopted, with separate roller bearings 35, mounted in a respective bore in the main eccentric, one on each side of the centre line joining the shaft axis and the engagement portion axis. This arrangement has been found to function more efficiently than friction reducing rims or inserts and acts positively in either direction of rotation. Each bearing 35 may be a fixed pip, or a simple ball or needle-bearing, but spring means may be provided to resiliently urge the respective bearings towards the centre of the portion 6 or toward the axis 5.

Various drive transmission arrangements are possible, for example in the embodiments shown in FIGS. 2, 3 and 4 the main drive need not be off-set from the axis 5 and employ a belt drive or gearing to drive the driven pulley, but the drive can be so mounted on the end plate 17 that it is in effect coaxial with the shaft axis and with such a construction a toroidal rotor portion of an electric motor can be mounted to extend between the driven pulley and the main eccentric, surrounding the sealing means, and the stator of the motor can be secured to the end plate 17.

Obviously the details of the drive can be varied from this simple arrangement to adopt a more complex construction if the requirements demand it. For example if we consider the embodiment shown in FIG. 6 the extension tube 33 forming part of the main eccentric can be terminated where the end plate 17 is contained therein, and the end plate 17 can be enclosed by a transverse plate or web portion integral with or attached to the tube 33 and extending axially to carry and engage a fixed tubular extension which continues on to the control or drive means. Within this fixed tube a drive shaft can be provided to engage with the transverse portion of the extension tube 33 and provide torque thereto, or a drive source can be provided within the static extension tube. As the tube is static and hollow the tube could be provided with a series of apertures around its periphery adjacent the extension 33 from the main eccentric and a turbine drive provided at the transverse portion lying on the control side of the end plate 17 to drive the main eccentric 33, air being pumped down the static tube from the control end and being free to return back along the passageway outside the static tube extension. With such an arrangement it will obviously be possible to accommodate the use of optical fibres or electrical control leads on the central axis. If such an arrangement is used, it may be found advantageous to provide a guard sleeve between the stationary extension to the fixed portion 32 so that the rotating section of the main eccentric 33 is covered by a sleeve which may merely consist of a flexible but low friction synthetic resin material or may be of a more rigid construction. Whatever the actual drive arrangement may be, if a static extension tube is provided in the manner just described to extend from the main eccentric extension tube 33 to a control or drive postion the arrangement can be utilised where there is a relatively long path between the control or drive point and the position of the end plate and in such a case it may be advantageous to employ a flexible re-inforced hose which would enable the transmission drive or controlled instrument to be used in circumstances where it is necessary to negotiate bends in a passageway, for example.

I claim:

1. A drive unit for effecting torque-transmission via a non-rotating intermediate sealing tube, in which a central member rotatable in a housing and extending through an unsealed aperture in a wall thereof has an engagement portion that is eccentric with respect to the axis of rotation of said central member which is substantially surrounded by said engagement portion the intermediate sealing tube is mounted freely on said engagement portion and freely fitted within a circular aperture in a main eccentric member which is mounted to be rotatable about said axis, the circular aperture in said main eccentric member having an eccentricity with respect to the axis of rotation of the central rotatable member that matches the eccentricity of said engagement portion, means being provided to drive said central rotatable member or said main eccentric to rotate about said axis of rotation, and output drive means being provided driven by said main eccentric or said central rotatable member, as the case may be, and sealing means being attached to said intermediate sealing tube to restrict rotation thereof about said central axis and couple its respective ends via flexible sealing members of said sealing means to housing portions that define a sealed enclosure to isolate said central member and said unsealed aperture from the remainder of the housing interior.

2. A drive unit as claimed in claim 1, in which said central member is a shaft and said engagement portion is formed by a circular section having a reduced cross-section and off-set from the axis of rotation.

3. A drive unit as claimed in claim 1, in which said central member is a shaft, and said engagement portion is formed by the formation or attachment of an annular enlargement off-set from the axis of rotation.

4. A drive unit as claimed in claim 1 in which said sealing means are formed by a pair of hoses, bellows or diaphragms, each provided with annular corrugations.

5. A drive unit as claimed in claim 4, in which said sealing means are of metal.

6. A drive unit as claimed in claim 1, in which a transverse piston extends from said intermediate sealing tube to engage in a cross-head cylinder bush to restrict axial rotation of the tube about said axis.

7. A drive unit as claimed in claim 6, in which the relative movement of said piston with respect to said cross-head cylinder bush is utilised to effect a pumping of lubricating oil about said unit, inlet and outlet valves being provided in a cylinder head attachment to said bush.

8. A drive unit as claimed in claim 6, in which relative movement of said piston with respect to said cross-head cylinder bush is produced by internal combustion, a cylinder head with inlet and outlet valves being attached to said bush to form a prime-mover.

9. A drive unit as claimed in claim 1, in which said main eccentric member is itself circular, and is mounted to be rotatable in an annular aperture concentric with the axis of rotation of said central rotatable member, which annular aperture is formed by an inner surface of a static support ring secured to said housing.

10. A drive unit as claimed in claim 1, in which said main eccentric member is supported from one side to be rotatable concentrically with respect to the axis of rotation of said central rotatable member.

11. A drive unit as claimed in claim 10, in which said main eccentric member is supported on a tubular extension surrounding said central rotatable member.

12. A drive unit as claimed in claim 10, in which said main eccentric member has a toothed periphery, and is mounted to rotate concentrically with respect to the axis of rotation of said central rotatable member by three gear wheels symmetrically disposed around said axis.

13. A drive unit as claimed in claim 12, in which a cup-shaped control knob surrounds said unit and engages said three gear wheels.

14. A drive unit for transmitting torque through a non-rotating sealing tube comprising a wall;
   a central member extending through an unsealed opening in said wall and having an axis of rotation;
   first and second axially spaced means for supporting said central member for rotation about said axis;
   a first eccentric member mounted on said central member between said first and second means for supporting, said first eccentric member being rotatable with said central member;
   substantially non-rotating sealing tube means extending along and surrounding at least the portion of said central member between said wall and the most distant of said means for supporting, said sealing tube means including an intermediate engagement portion adjacent said first eccentric member;
   a second eccentric member having an eccentric opening surrounding said intermediate engagement portion and said first eccentric member so that said second eccentric member can move freely around said intermediate portion, the eccentricity of said opening relative to said axis of rotation matching that of said first eccentric member so that rotation of one of said central and second members drives the other of said central and second members through said first eccentric member and said engagement portion;
   means for mounting said second member for rotation about said axis;
   means for rotatably driving one of said second member and said central member; and
   means for coupling output torque from the other of said second and central members.

* * * * *